United States Patent
Patel

[11] 3,790,832
[45] Feb. 5, 1974

[54] MOTOR-TACHOMETER
[75] Inventor: Jayant K. Patel, Dayton, Ohio
[73] Assignee: TRW Inc., Cleveland, Ohio
[22] Filed: Feb. 3, 1972
[21] Appl. No.: 223,089

[52] U.S. Cl.............. 310/113, 310/154, 310/237, 310/239
[51] Int. Cl. ......................................... H02k 47/04
[58] Field of Search..... 310/113, 68, 114, 112, 154, 310/126, 233, 236, 237, 171, 177, DIG. 6; 318/313, 327

[56] References Cited
UNITED STATES PATENTS

| | | | |
|---|---|---|---|
| 2,818,518 | 12/1957 | Phaneuf | 310/177 |
| 3,639,792 | 2/1972 | Anderson | 310/113 |
| 1,508,096 | 9/1924 | Garner | 310/113 |
| 3,564,705 | 2/1971 | Cochardt | 310/154 |
| 1,887,055 | 11/1932 | Hennesy | 310/126 |
| 2,113,102 | 4/1938 | Whittle | 310/113 |
| 3,429,494 | 2/1969 | Chang | 310/113 |

FOREIGN PATENTS OR APPLICATIONS
644,773 10/1950 Great Britain ..................... 310/171

Primary Examiner—R. Skudy
Attorney, Agent, or Firm—Biebel, French & Bugg

[57] ABSTRACT

A combined motor and tachometer in a single housing incorporates an axial commutator for the motor and a radial commutator for the tachometer, in back-to-back relation, providing a maximum length reluctance path between the field for the motor and the field for the tachometer, and also between the armature of the motor and the armature of the tachometer. In this manner, the relatively sensitive tachometer is effectively isolated from adverse affects of the relatively heavier motor field.

1 Claim, 4 Drawing Figures

PATENTED FEB 5 1974 3,790,832
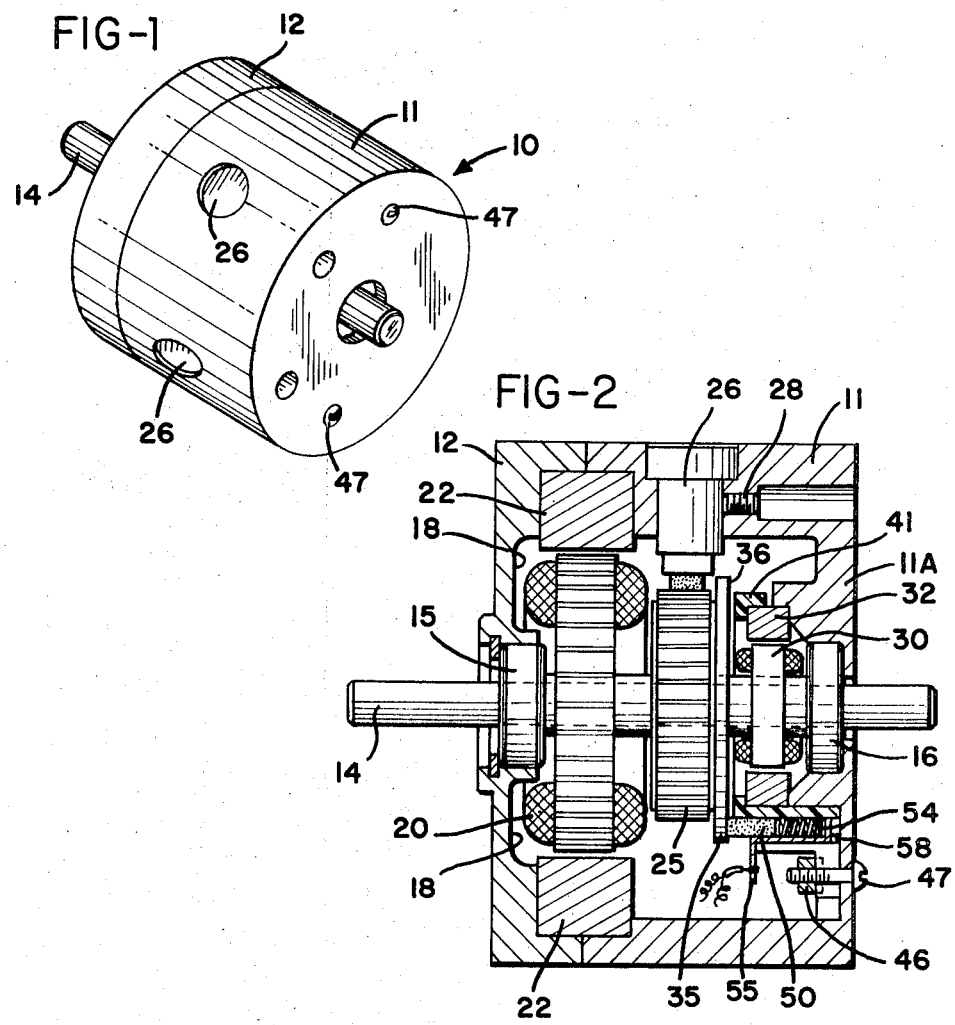
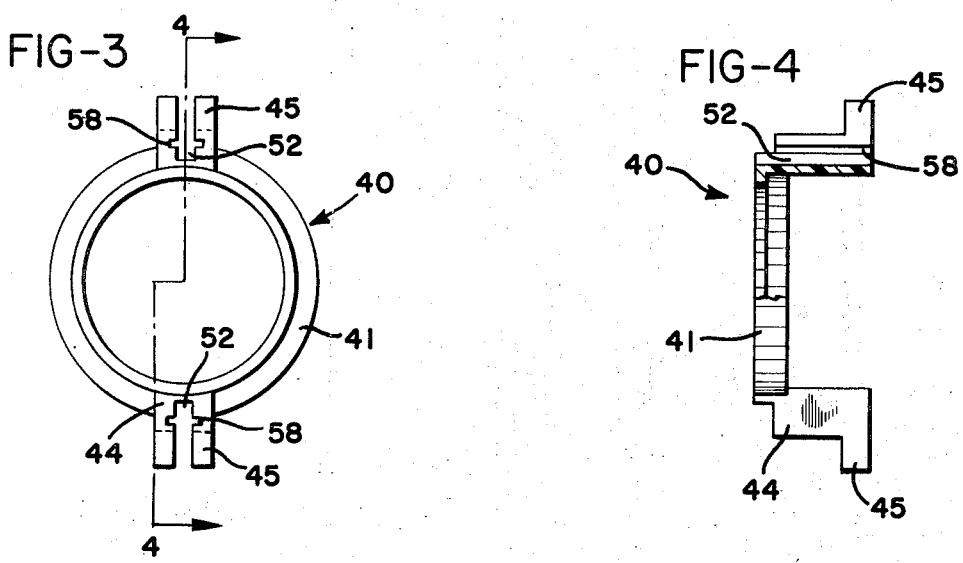

MOTOR-TACHOMETER

BACKGROUND OF THE INVENTION

Dual armature rotating electric machines are known. It is also known to incorporate a tachometer generator with an electric motor. Typical examples of two or more armatures mounted on a common shaft each having its own magnetic field and commutator structures are shown in Garner, U.S. Pat. Nos. 1,508,096 of 1924, Lamme, 702,657 of 1902, LeBlanc, 768,467 of 1904, and Persson, 3,381,199 of 1968. Examples of tachometers incorporated into electric motors include Willis U.S. Pat. Nos. 3,231,807 of 1966 and Chiang, 3,429,494 of 1969. Since it is desired that the tachometer provide a highly accurate indication of shaft rpm and since the tachometer output is frequently used in computer applications and the like, it is desirable that there be a minimum of interference or cross-talk between the motor structure and the tachometer structure.

SUMMARY OF THE INVENTION

The present invention is directed to a dual armature rotating machine and more particularly to a machine in which there is a motor and a tachometer generator incorporated in a single housing. The invention has the advantage of providing optimum spacing between the magnetic field structures and armatures of the respective motor and generator. To this end, the motor and generator commutators are positioned on the common shaft axially between the respective armatures, thus optimizing the spacing of the magnetic field structures. Permanent magnets are used for the fields in the preferred embodiment. Improved physical isolation is achieved by forming the tachometer commutator as a radial commutator and having its commutating surface facing axially away from the surface of the motor commutator. Such an arrangement provides mechanical isolation of dust between the commutators. Preferably, the tachometer commutator is formed with a diameter which is slightly greater than that of the motor commutator to enhance the mechanical protection.

The assembly is made even more compact by suitably undercutting the end walls of the housing in the region of the armatures so that a portion of the motor armature actually rotates opposite a portion of one of the shaft support bearings.

It is accordingly an important object of the invention to provide a dual wound armature electric machine in which the commutators are positioned side-by-side and axially between the armatures.

Another object of the invention is the provision of a combined motor and a tachometer in which the tachometer commutator is positioned axially adjacent the motor commutator to provide for optimum spacing between the motor and tachometer fields and armatures.

Another important object of the invention is the provision of a dual armature motor-generator unit, in which the motor has an axial movement commutator, the generator has a radial commutator, and these commutators are positioned on the common shaft in back-to-back relation.

These and other objects and advantages of the present invention will become apparent from the following description, the accompanying drawings and the appended claims.

BRIEF DESCRIPTION OF THE DRAWINGS

FIG. 1 is a perspective view of a rotating electric machine according to my invention;

FIG. 2 is a section through the machine of FIG. 1;

FIG. 3 is an end elevation of the brush yoke used for the tachometer; and

FIG. 4 is a side elevation, partly broken away, of the brush yoke.

DESCRIPTION OF PREFERRED EMBODIMENT

The motor is shown in FIGS. 1 and 2 as including a split housing 10 including a main housing portion 11 and a housing cap portion 12. The housing portions 11 and 12 rotatably support a motor shaft 14 on a bearing 15 received in the portion 12 and a bearing 16 received in the portion 11. The cap portion 12 is undercut as indicated at 18 to provide clearance for a portion of a rotating armature 20. The permanent field magnet 22 associated with the armature 20 is positioned between the housing portions 11 and 12. The armature 20 and its permanent magnet field 22 comprises a DC drive motor. It will be seen that a portion of the armature 20 is actually positioned radially opposite the bearing 15 within the undercut 18 to provide a compact overall arrangement.

The commutator 25 for the motor armature 20 is positioned axially inwardly of the armature 20. The commutator 25 is of a conventional drum-type, and the housing portion 11 is counter-sunk to receive a pair of brush holders 26 at 180° electrical degrees to each other for cooperation with the commutator 25 in the conventional manner. The brush holders 26 are retained in place by set screws 28 received within the housing portion 11.

The tachometer includes a tachometer armature 30 also received on the shaft 14, and a tachometer permanent field magnet 32. The tachometer armature 30 employs a radial commutator as indicated at 35. The radial commutator 35 is positioned in back-to-back relation with the axial commutator 25, and has its segmented commutating surface 36 facing away from the commutator 25. Further, the commutator 35 is preferably of a diameter which is slightly larger than that of the commutator 25.

A combined brush holder and magnet retainer yoke 40 for the tachometer is shown in FIGS. 3 and 4. The yoke 40 has a circular section 41 which is received over the magnet 32 and retains the magnet 32 in a recess formed in the end well 11A of housing portion 11. The yoke 40 is formed with inwardly-extending bifurcated brush holder portions 44, which portions terminate in outwardly-turned legs 45. The legs 45 are retained on the housing portion 11 by threaded clamps 46 and bolts 47, as shown in FIG. 2.

A pair of carbon brushes 50 are mounted for axial movement within the openings 52 formed in the brush holder portions 44 and are urged axially toward the commutator face 36 by brush springs 54. Metal brush retainer clips 55 are positioned within slots 58 formed in the brush holder portions 44, and retain the brushes while providing an electrical connection to the brushes.

The arrangement of the invention is one in which there is substantial physical separation in the magnetic paths between the magnets 22 and 32, and armature 20 and armature 30. This is accomplished by positioning the commutator structures axially between the respective armature structures, so that the interposition of these elements results in a corresponding increase in the reluctance paths between the fields and armatures. The arrangement is such that the tachometer magnet 32 is in effect supported on the end wall 11A of the housing 11 so that the reluctance path between it and the substantially larger permanent magnet 22 for the armature 20 is maximized. Also, the arrangement of this invention has practical importance in forming a corresponding spacing between the pairs of armatures and a corresponding reduction in its former coupling between the armature windings. Armature coupling causes harmful spike output in the tachometer due to transients or pulses in the motor armature. Such spikes or noise in the tachometer's output can give a false indication of speed.

While it is within the scope of this invention to use a pair of drum commutators, the arrangement described and illustrated in FIG. 2 is preferred. The radial commutator 35 may be of the printed circuit board type and that is preferred in a tachometer due to the face that the printed circuit board commutator is useful for low-current applications. Additionally, the radial commutator is inherently isolated from the axial commutator and thus tends to run clean over a long period of time.

While the form of apparatus herein described constitutes a preferred embodiment of the invention, it is to be understood that the invention is not limited to this precise form of apparatus, and that changes may be made therein without departing from the scope of the invention.

What is claimed is:

1. A combined motor and tachometer comprising a drive shaft, separate motor and tachometer armatures mounted in axially spaced relation on said shaft, motor housing means surrounding said armatures and rotationally supporting said shaft, a pair of correspondingly spaced fields associated with said housing means one each for each of said armatures, a drum-type motor commutator on said shaft positioned in the space between said armatures adjacent said motor armature and having an axial commutating surface, disk-type tachometer commutator on said shaft in the space between said armatures positioned adjacent said tachometer armature and being formed with a radial commutating surface, said radial surface facing away from said axial commutating surface and toward said tachometer armature, and said tachometer commutator being formed with a radial diameter which exceeds the diameter of said motor commutator for isolating, and providing mechanical protection of, said tachometer commutator from said motor commutator, said tachometer field including a permanent magnet in surrounding relation to said tachometer, a combined magnet retainer and brush holder having an encircling yoke portion supporting said magnet and further having a pair of axially extending brush holder portions, means mounting said retainer on said housing at said brush holder portions, and means in said brush holder portions slidably receiving a corresponding pair of axially movable brushes for coaction with the radial face of said tachometer commutator.

* * * * *